United States Patent [19]
Schmisseur et al.

[11] Patent Number: 6,128,718
[45] Date of Patent: Oct. 3, 2000

[54] APPARATUS AND METHOD FOR A BASE ADDRESS REGISTER ON A COMPUTER PERIPHERAL DEVICE SUPPORTING CONFIGURATION AND TESTING OF ADDRESS SPACE SIZE

[75] Inventors: Mark A. Schmisseur, Phoenix; Barry Davis, Scottsdale, both of Ariz.

[73] Assignee: Intel Corporation, Santa Clara, Calif.

[21] Appl. No.: 08/919,376

[22] Filed: Aug. 28, 1997

[51] Int. Cl.[7] ................................. G06F 9/35; G06F 12/10
[52] U.S. Cl. ........................... 711/212; 711/220; 711/211
[58] Field of Search .................................... 711/170, 202, 711/172, 100, 212, 220, 211; 395/281, 307, 500

[56] References Cited

U.S. PATENT DOCUMENTS

| | | | |
|---|---|---|---|
| 4,206,503 | 6/1980 | Woods et al. | 711/212 |
| 4,400,794 | 8/1983 | Koos | 711/202 |
| 4,502,115 | 2/1985 | Eguchi | 710/127 |
| 5,446,869 | 8/1995 | Padgett et al. | 395/500 |
| 5,608,876 | 3/1997 | Cohen et al. | 395/281 |

OTHER PUBLICATIONS

PCI Local Bus Specification, revision 2.1, pp. vii, 173–175, 187–190 (Oct. 21, 1994).

Edward Solari and George Willse, PCI Hardware and Software Architecture and Design, pp. 557–558, 587–588, 609–610, 723–727 (3d ed. 1996).

Intel Corporation, i960® RP Microprocessor User's Manual, pp. 1–9 to 1–10, 16–24 to 16–28, 16–35 to 16–39, 16–42 to 16–45, 16–50 (1st ed. Feb. 1996).

Intel Corporation, i960® Rx I/O Microprocessor Developer's Manual, pp. 1–10, 16–25 to 16–28, 16–36 to 16–41, 16–46 to 16–49, 16–57 (2nd ed. Apr. 1997).

Primary Examiner—B. James Peikari
Attorney, Agent, or Firm—Blakely, Sokoloff, Taylor & Zafman LLP

[57] ABSTRACT

A method for providing a base address register in a computer system that allows the length of the base address portion of an address to be changed and thereby allows various sizes of address spaces to be supported by the same base address register. The method employs steps that enable and disable bits of the base address register to properly support the desired address space size. Some embodiments of the method set disabled bits of the base address register to a known value. An apparatus that employs the method includes a second register connected to the base address register to supply signals that enable and disable bits of the base address register appropriately.

18 Claims, 5 Drawing Sheets

APPARATUS AND METHOD FOR A BASE ADDRESS REGISTER ON A COMPUTER PERIPHERAL DEVICE SUPPORTING CONFIGURATION AND TESTING OF ADDRESS SPACE SIZE

BACKGROUND

Computer systems are typically made up of one or more central processing units (CPU), memories, and one or more peripheral devices that allow a CPU to control and transmit data to and from various peripheral units such as printers, disk drives, and the like. The use of a communications interface or system bus for coupling separate devices, such as processors, memories and peripherals, of a computer system is well known in the prior art. Typically, computer systems are designed to allow peripheral devices to be plugged into the system bus. By plugging in appropriate peripheral devices, the computer system can be configured to meet the specific needs of the computer user.

To make their computers more attractive to users, most manufacturers have tried to standardize the design of their computer buses. Standardized buses such as ISA, EISA, and PCI are well known in the prior art. As an example of a standardized bus, the Peripheral Component Interconnect (PCI) bus is a high performance 32 or 64 bit bus with multiplexed address, control and data lines. The PCI bus is intended for use as an interconnect mechanism between highly integrated peripheral devices and processor/memory subsystems. The specification for the PCI bus is set forth in the document PCI Local Bus Specification, revision 2.1, October, 1994. This manual is prepared and maintained by the PCI Special Interest Group (PCI-SIG). The PCI-SIG is an organization that is open for membership to all companies in the computer industry.

While the ability to change the configuration of a computer system by plugging in peripheral devices is a useful and desirable feature of a computer system, it can be difficult to have all the peripheral devices plugged in to a computer system work correctly together. Peripheral devices must be configured so that a CPU can uniquely identify each peripheral device. In the prior art, some peripheral devices require that switches be set to configure the peripheral device. Determining the settings necessary to avoid conflicts between devices is difficult. Making the settings correctly, even if correctly known, could also be difficult. Further, previously correct settings might be made incorrect by later additions of new peripheral devices.

To simplify the addition of peripheral devices to a computer system, it is desirable to have computer systems with automatic configuration support, which is sometimes described as plug and play capability. Automatic configuration allows the automatic software detection of configurable peripheral devices in a computer system and the subsequent assignment of system resources to this hardware. No adjustment of switches or jumpers is required and no resource conflicts should exist after the configuration process is performed.

The PCI bus is an example of an architecture that supports automatic configuration. Among the many features that the PCI Specification provides is the use of address spaces which may be accessed via the PCI bus. The PCI Specification also provides for the use of a base address register to define the starting address of these address spaces. Each of the address spaces on a PCI device may be a size that is a power of two bytes. For PCI Memory the address space is typically from four kilobytes, 2¹², to two gigabytes, 2³¹, in size. This means that from twelve to thirty-one least significant address bits are required to address a byte in the address space. The remaining most significant address bits are used to distinguish one address space from another. These most significant address bits are the base address for the device. The PCI Specification provides that this base address may be programmed by writing the address into the base address register on the device through the PCI bus. The ability to change the base address of a device in a computer system by a host processor allows the computer system to be configured automatically when power is applied.

The PCI Specification provides for three types of base registers, a Memory Base Address Register, an Expansion ROM Base Address Register, and an I/O Base Address Register. The Memory Base Address Register defines the first address of a block of locations in Memory Space where data may be read or written on the PCI device. The Expansion ROM Base Address Register defines the first address of a read-only memory device (Expansion ROM) residing on a PCI add-in board. The Expansion ROM contains code that is executed by the PCI host processor to provide initialization and system boot functions for the PCI add-in board. The I/O Base Address Register defines the first address of a block of locations in I/O Space which can accept input and output operations on the PCI device.

To configure base addresses dynamically, the host processor needs to know the size of the address space associated with the base address. This allows the host processor to identify valid base addresses and then determine what the next available address will be after the base address is set. Typically, a base address register implements writable bits only for the upper address bits that are not used to address locations within the address space associated with the base address. In a typical PCI device, this means that only the upper one to twenty bits of thirty-two PCI address bits in a Memory or Expansion ROM Base Address Register are writable. This characteristic of the base register can be used to determine the size of the address space associated with the base address register.

The startup protocol defined by the PCI Specification illustrates this technique. In a typical startup of a PCI computer system, an architectured process is practiced between the PCI processor and the PCI device. (See, for example, Edward Solari and George Willse, *PCI Hardware and Software Architecture and Design*, pp. 558, 588, 610, 723–727 (3d ed. 1996)) During this process, the PCI host computer writes a pattern of all ones, x'FFFF FFFF', or of all ones except for low order zeroes, e.g., x'FFFF F000', to a base address register. The base register is then read. The number of ones that were actually written establishes the size of the address space associated with the base address register. For example, if the value returned by reading the base address register is x'FFFF 8000' then a thirty-two kilobyte address space is associated with that base address register.

A limitation of the base address register mechanism is that it does not provide for changing the size of the address space required. For example, a peripheral device might use different plug-in ROMs of differing sizes depending upon the application. Or a device might have differing amounts of RAM that should be made available to the host processor depending on the number of peripheral units being controlled by the device. It is also desirable to be able to produce a general purpose circuit that can provide a peripheral device interface, including a base address register, for a wide variety of peripheral devices that have fixed address space requirements but which vary from device to device.

A solution for changing the size of address space in the prior art is the use of an additional register to define the size of the address space. However, it is desirable that the base register with a changeable address space size continue to function identically to a base address register with a fixed address space size so that the host processors do not require modification to interact correctly with base address registers associated with changeable address space sizes.

One solution to the problem of providing a base address register with a changeable address space size is illustrated by the Intel® i960® RP Microprocessor. Intel Corporation, i960® *RP Microprocessor User's Manual*, pp. 16-35 to 16-39, 16-42 to 16-43 (1st ed. February 1996). There, the use of a Limit Register is disclosed. A value is written to the Limit Register based on the size of the address space. When the writing of a value of x'FFFF FFFF' to the base register is detected, the next read of the base register returns the value contained in the Limit Register rather than the base register contents.

This solution has several limitations which cause improper operation for some host processors. If the host processor writes a value of other than x'FFFF FFFF' the mechanism which returns the Limit Register value is not triggered. Such writes are valid in the PCI Specification. Detecting a write of x'FFFF FFFF' is difficult unless the write is performed as a thirty-two bit wide, double word, write. The PCI Specification permits the use of four 8 bit wide, byte writes, or two 16 bit wide, word writes. The described mechanism only returns the value of the Limit Register on the first read of the base register after writing x'FFFF FFFF'. However, the PCI Specification permits multiple reads of the base register.

A solution is needed that allows an address space size to be changed and provides a base register that responds to writes and reads in the same manner as if the address space size were fixed.

BRIEF SUMMARY

The present invention is directed to a method and an apparatus that satisfies this need to have a changeable address space size that will respond to base register writes and reads in the same manner as if the address space size were fixed. A computer system employing the method of the present invention enables for writing the upper bits of a base address register which correspond to the address bits not needed for addressing data within the address space. The lower bits of the base register, which correspond to the address bits needed for addressing data within the address space, are disabled for writing.

BRIEF DESCRIPTION OF THE DRAWINGS

These and other objects, features, and advantages of the method and apparatus of the present invention will be better understood from the following detailed description of the invention, appended claims, and accompanying drawings in which:

DETAILED DESCRIPTION OF THE INVENTION

A method and an apparatus that provides a base address register that supports a changeable address space size is described. The described base address register responds to base register writes and reads in the same manner as a base address register that supports a fixed address space size.

In the following description, numerous specific details are set forth, such as specific devices, bus protocols, address bits, and memory locations, in order to provide a thorough understanding of the present invention. It will be apparent to one skilled in the art, however, that the present invention may be practiced without these specific details. In other instances, well-known techniques and structures have not been shown or described in detail or have been shown in diagrammatic or block diagram form in order not to unnecessarily obscure the present invention. It is to be noted that a preferred embodiment of the present invention is described, however, it is readily understood that other embodiments can be designed and implemented without departing from the spirit and scope of the present invention. Furthermore, it is to be appreciated that the present invention need not be limited to the PCI bus standard, but can be adapted for use with other buses, both standard and nonstandard, and for use without a bus as well.

Definitions

A register is a device for storing values in a computer system. More specifically, a register stores an amount of data that can be used as an address or as an operand in a single computer operation. In a binary computer, the values stored in a register are represented as binary digits or bits. Therefore a register is comprised of a plurality of bits. As used herein, the term register is intended to include a binary register comprised of bits as described. The term register is intended to include devices which store values by any means such as a switchable electrical circuit, a mechanical switch, jumpers, or selectively connected data pins. The term register is also intended to include devices that may transform the form of the value stored between any of the value as input, the value as stored, and the value as output.

A base address is the starting address of a block of consecutive addresses. The block of consecutive addresses contains a number of addresses which is termed the block size. The locations within the block can be addressed from zero to (block size—1). If the block size is a power of two and the base address of the block is a multiple of the block size, then every address in the block will consist of the base address which is constant for all addresses within the block plus the address of the location within the block. A base address register is a register which contains the base address of a block of addresses that can be addressed in the manner described above. If the block size is $2^n$, then n bits are required to address locations within the block since n bits can represent values from 0 to $2^n-1$. The base address register supplies any additional addressing bits required along with the n bits used for addressing within the block. If a complete address is m bits in length, then the base address register supplies m−n most significant bits of the address. Because the n least significant bits are not used to store base address information, these bits may be used to store other information. As used herein, the term base address register refers to a register or a portion thereof which stores base address information. When used in the expression base address register, the term register is limited to registers where the value stored may be changed by the operation of the computer system.

Overview

Figure 1:
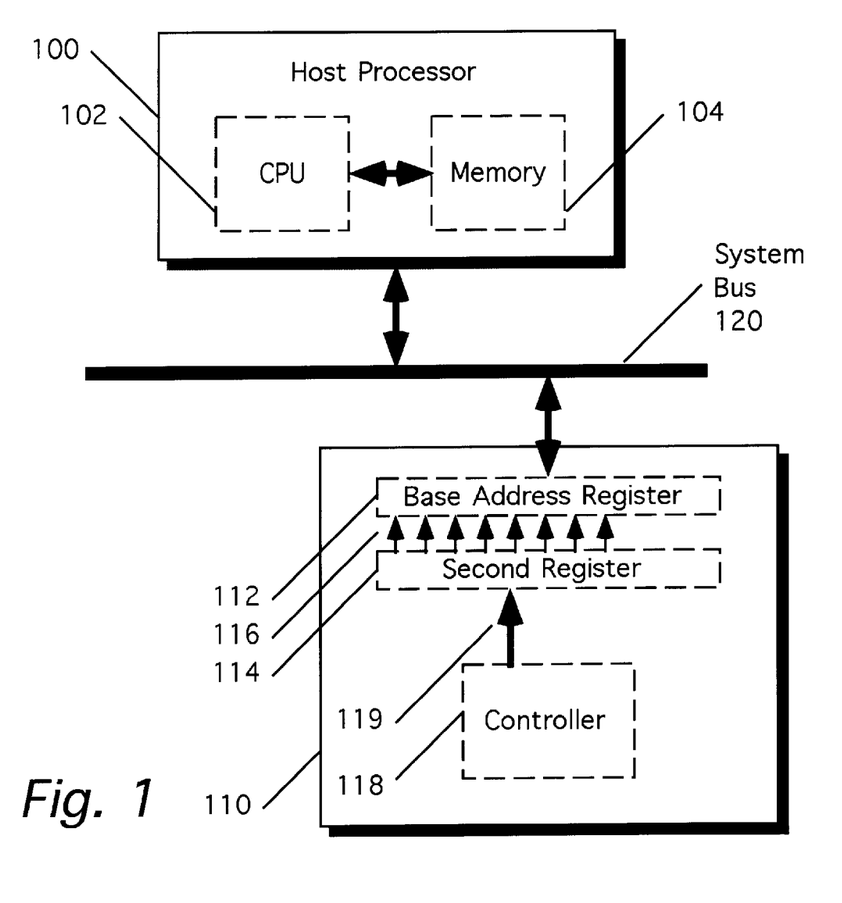
FIG. 1 shows a block diagram of a computer system that includes a base address register in an embodiment of the present invention.

FIG. 1 shows a block diagram of a computer system that includes an embodiment of the invention. The computer system is comprised of a host processor 100 and a peripheral device 110 connected by a system bus 120. The system bus 120 allows data to be sent to and from the host processor 100 and the peripheral device 110. The host processor 100 comprises a central processing unit (CPU) 102 and a memory 104. The CPU 102 fetches and executes program instructions from the memory 104. As directed by the program instructions, the CPU 102 can send instructions and data to the peripheral device 110. The CPU 102 can also retrieve data from the peripheral device 110. Transfers of instructions and data between the CPU 102 and the peripheral device 110 are made through the system bus 120. To initiate a transfer of data or instructions to a peripheral device, the CPU 102 must transmit an appropriate address to identify the peripheral device 110 and the location on the peripheral device 110 that is to be involved in the transfer.

Figure 2:
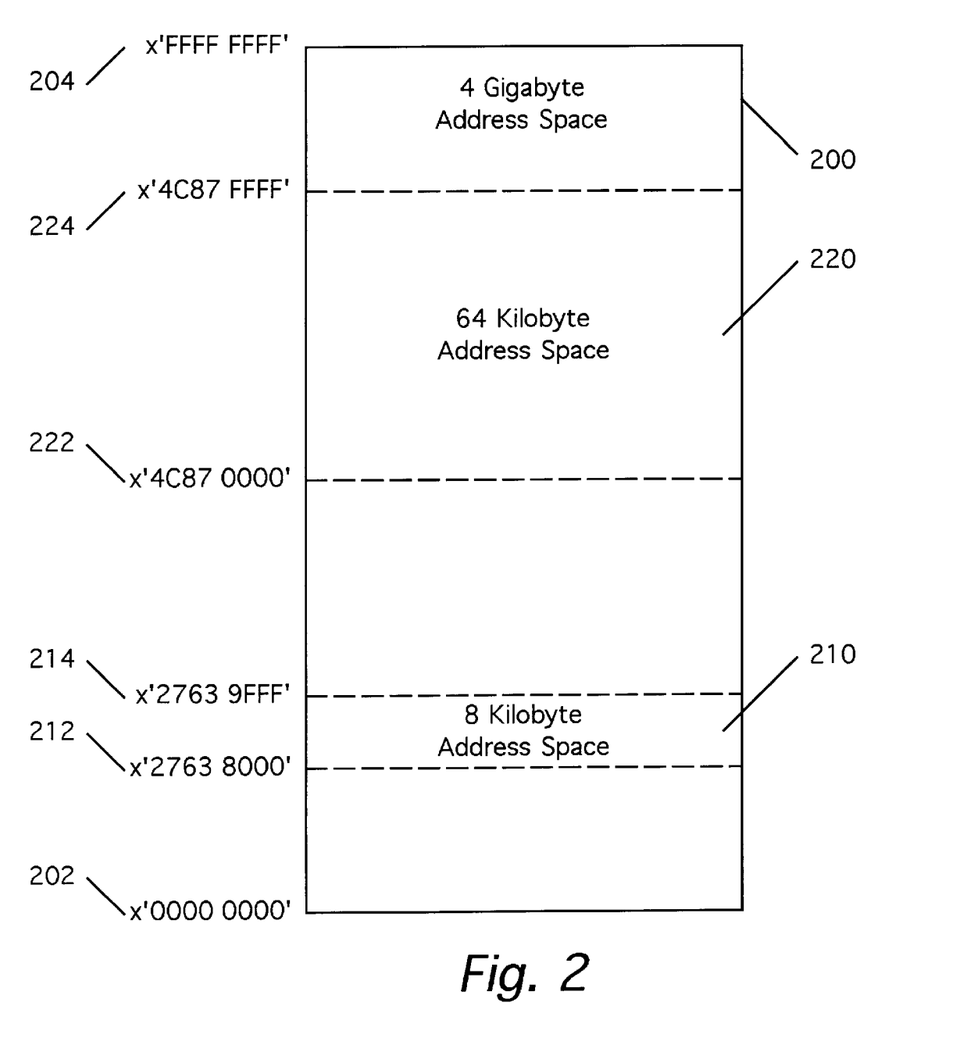
FIG. 2 shows a diagram of an exemplary peripheral address space for use with an embodiment of the present invention.

FIG. 2 shows a diagram of an address space 200. This example shows a 4 gigabyte address space 200 that uses thirty-two bit addresses with a starting address 202 of x'0000 0000' and an ending address 204 of x'FFFF FFFF'. Two blocks of address space are shown as allocated within the address space 200, an 8 kilobyte block of address space 210 and a 64 kilobyte block of address space 220.

The address of a location in memory can be viewed as having two parts. The most significant part block address and the least significant part is the within block address. 8 kilobytes is $2^{13}$ bytes. As explained above, 13 bits are required to address 8 kilobytes. The within block addresses are x'0000' through x'1FFF'. FIG. 2 shows the 8 kilobyte address space 210 with a starting address 212 of x'2763 8000' which is a multiple of 8 kilobytes. The ending address 214 of the 8 kilobyte address space 210 is x'2763 9FFF' which is the starting address 212 of x'2763 8000' plus the within block ending address of x'1FFF'. Similarly, 64 kilobytes is $2^{16}$ bytes and 16 bits are required to address 64 kilobytes. The within block addresses are x'0000' through x'FFFF'. The starting address 222 shown for the 64 kilobyte address space is x'4C87 0000' which is a multiple of 64 kilobytes. The ending address 224 is x'4C87 FFFF' which is the starting address 212 of x'4C87 0000' plus the within block ending address of x'FFFF'. In this example, the 8 kilobyte address space 210 requires 19 bits (32−13) to be supplied by a base address register 112 which will be concatenated with the 13 within block address bits to create the full 32 bit address. Likewise, the 64 kilobyte address space 210 requires 16 bits (32−16) to be supplied by a base address register 112 that will be concatenated with the 16 within block address bits to create the full 32 bit address.

Typical Embodiments

Referring again to FIG. 1, a base address register 112 is shown according to an embodiment of the present invention. There is a second register 114 that is connected to the base address register 112 by a plurality of connections 116 which allow the connected bits of the base address register 112 to be enabled and disabled for writing. All the bits of the base address register 112 which are required for addressing the smallest allowable address space are connected to the second register 114. The bits of the base address register that are not needed for addressing locations within the address space are enabled for writing. The bits of the base address register that are needed for addressing locations within the address space of the given size are disabled for writing.

A controller 118 is connected by a data path 119 to the second register 114. The controller 118 writes the appropriate value to the second register 114 to enable the portion of the base address register 112 required to support the desired address space size. In certain embodiments of the present invention, the function of the controller 118 may be performed by the host processor 100 and the connection 119 may be provided by the system bus 120.

Considering the example of FIG. 2 and assuming the smallest allowable address space is 4 kilobytes, the base address register 112 in an embodiment of the present invention would connect twenty bits in the base address register 112 to allow them to be enabled and disabled based on the size of the address space associated with the base address register 112. Twenty bits represents the 32 bits required to form a complete peripheral address minus the 12 bits necessary to address the within block 4 kilobytes ($2^{12}$ bytes) of the smallest allowable address space.

Figure 3A:
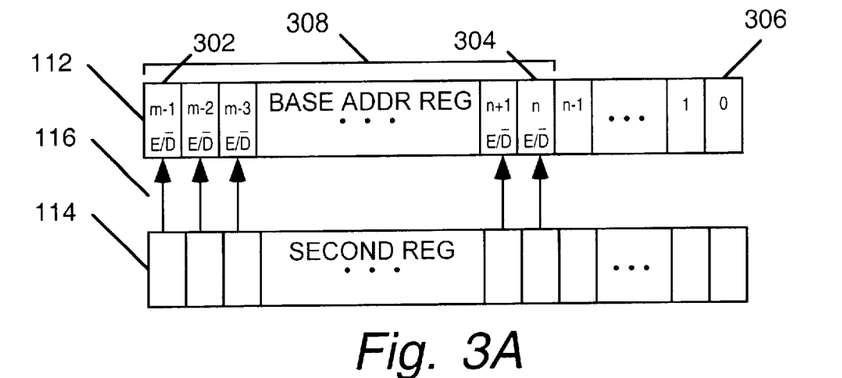
FIG. 3A shows a block diagram of a base address register in one embodiment of the present invention.
Figure 3B:
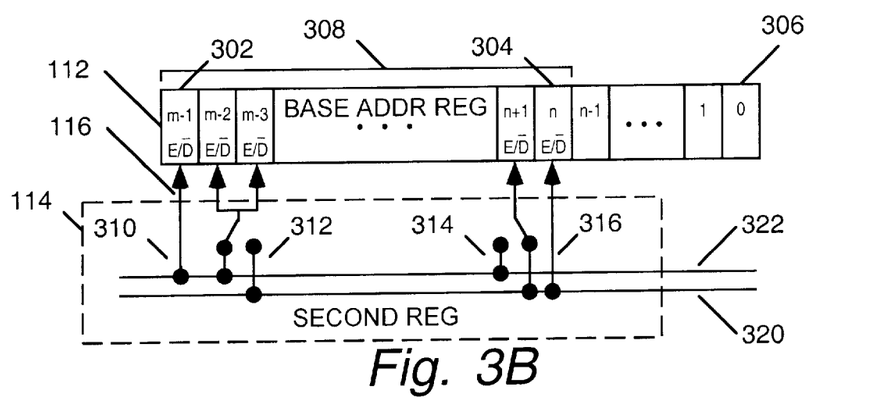
FIG. 3B shows a block diagram of a base address register in another embodiment of the present invention.
Figure 3C:
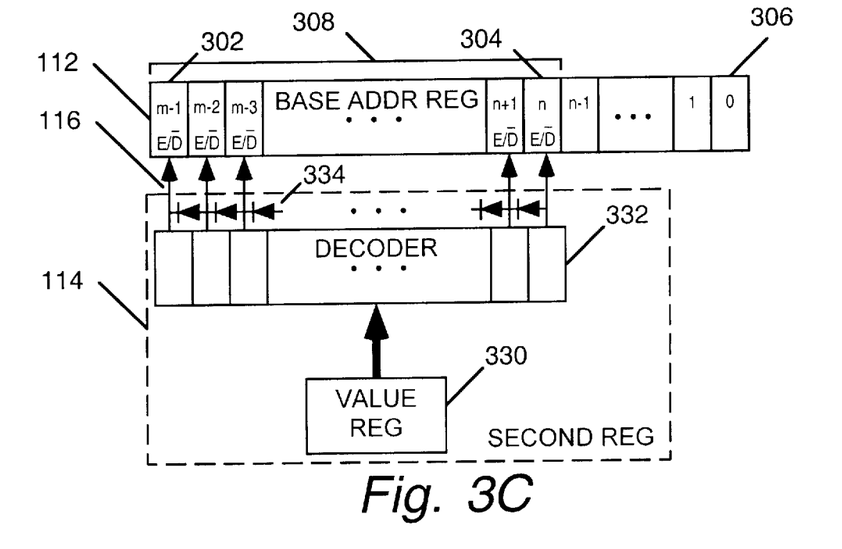
FIG. 3C shows a block diagram of a base address register in another embodiment of the present invention.

FIGS. 3A, 3B, and 3C show block diagrams of several embodiments of a base address register 112. The base address register 112 comprises at least m−n bits where m is the number of bits in a complete address and n is the number of bits required to address the smallest allowable block of addresses associated with the base address register 112. The least significant bit 306 of the base address register 112 is referred to as bit 0. The most significant bit 302 is bit m. The bits from bit n 304 through bit m 302 are collectively referred to as the base address bits 308. All the base address bits 308 are required to form a complete address for the smallest allowable block of addresses. Fewer base address bits 308 are required for larger blocks of addresses. The base address bits 308 that are not used, if any, begin with bit n 304 and continue as far as necessary toward bit m 302. Each of the base address bits 308 receives an Enable/Disable signal that enables the bit for writing if asserted and disables the bit for writing if not asserted. The Enable/Disable signal is provided to the base address bits 308 through the connections 116. In some embodiments of the present invention, base address bits 308 which are disabled are set to return a known value when read.

In the embodiment of the present invention shown in FIG. 3A, the second register 114 is a register comprising bits which correspond to each of base address bits 308. The size of the address space associated with the base address register 112 is stored in the second register 114 as a value having enabling logic levels, such as logical ones, in the bit positions to be enabled and disabling logic levels, such as logical zeroes, in the bit positions to be disabled. The base address bits 308 are enabled by the enabling logic levels and disabled by the disabling logic level in the second register 114. If the size of the block of address space associated with the base address register 112 is $2^b$, the value written to the second register 114 in this embodiment of the invention is the one's compliment of $2^b-1$. The value written to the second register 114 contains ones in the upper bit positions that correspond to the base address register 112 bit positions for the base address portion of the block address and zeroes in the bit positions that correspond to the within block portion of the block address. In another embodiment of the invention, bits of the base address register which are disabled for writing are also set to a known value such as logical zero.

In the embodiment of the present invention shown in FIG. 3B, the second register 114 is a combination of hard wired connections 310, 316 and switched connections 312, 314 that supply the appropriate Enable/Disable signals to the base address register 112. A first bus 320 supplies the disable logic level and a second bus 322 supplies the enable logic level. In the example shown in FIG. 3B, the most significant bit 302 is permanently enabled by a hard wire connection 310 to the enable logic level of the second bus 322. The least significant bit 304 is permanently disabled by a hard wire connection 316 to the disable logic level of the first bus 320. The connection 116 to bit n+1 of the base address register 112 is switchably connected to the disable logic level of the first bus 320 and to the enable logic level of the second bus 322. Bit n+1 of the base address register 112 is enabled and disabled by setting of the switch 314 connected to the Enable/Disable signal of the bit. Similarly, bits m−2 and m−3 are shown wired together and connected to a second switch 312 which enables and disables both bit positions simultaneously. This embodiment of the present invention is useful for devices where the number of possible block sizes is limited and the required block size is determined before the device is installed.

In the embodiment of the present invention shown in FIG. 3C, the second register 114 includes decoding circuitry to create the signals placed on the connections 116 to the Enable/Disable signals of the base address bits 308. In the example shown, if the size of the block of address space associated with the base address register 112 is $2^b$, the value written to the second register 114 and held in the value register 330 in this embodiment of the invention is m−b, the number of bits contributed to the complete address by the base address register which is the number of bits in a complete address less the number of bits required to address a location within the block. The decoder 332 places the enable logic level on one output depending on the value stored in the value register 330. The diode logic 334 then propagates the enable logic level to the control lines connected to the more significant bits. Thus the control lines connected to the upper bit positions of the base address register 112 bit positions that correspond to the base address portion of the block address are enabled and the bit positions that correspond to the within block portion of the block address are disabled.

Use

There are two phases to the use of the present invention, initialization and address space size query. Certain embodiments of the present invention, such as those shown in FIGS. 3A and 3C, require an initialization phase to store a value in the second register 114 each time there is a system reset. Other embodiments, such as the one shown in FIG. 3B, are initialized before installation and no further initialization is necessary. In the address space size query phase, a base address register 112 receives and responds to requests from the host processor CPU 102 that allow the host processor CPU 102 to determine the size of address space associated with the base address register 112.

Figure 4:
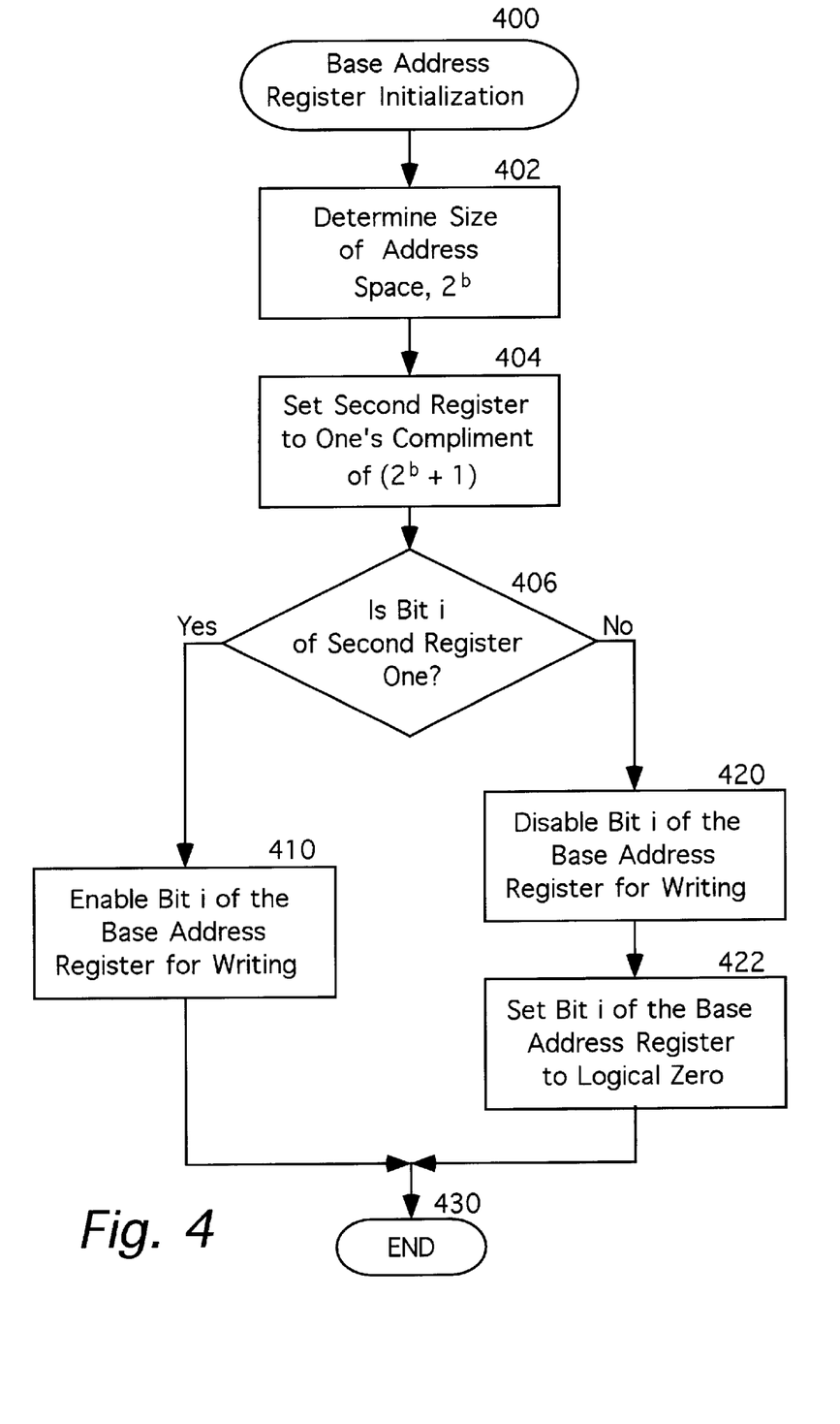
FIG. 4 shows a flow chart of the initialization phase of an embodiment of the present invention of the type shown in FIG. 3A.

FIG. 4 shows a flow chart of the initialization phase of an embodiment of the present invention of the type shown in FIG. 3A and which sets base address bits 308 that are disabled to return a value of logical zero when read. Initialization of the base address register apparatus of this embodiment begins 400 with determining the size of the address space required which must be a power of two, $2^b$ 402. The value of the one's compliment of $2^b-1$ is then written to the second register 404. If a bit of the second register 114 is a logical one 406, then the corresponding bit of the base address register 112 is enabled for writing 410. If a bit of the second register 114 is not a logical one 406, then the corresponding bit of the base address register 112 is disabled for writing 420 and a value of logical zero is set in the base address register 422. During the initialization phase, the base address register 112 is not available to respond to requests from a host processor 100. In a system that operates according to the PCI Specification, a device signals that it is unable to respond to a request by activating the PCI DEVSEL# and PCI STOP# signals and deactivating the PCI TRDY# signal. Upon completion of the initialization phase 430, the base address register 112 is ready to respond to requests from a host processor 100.

Figure 5:
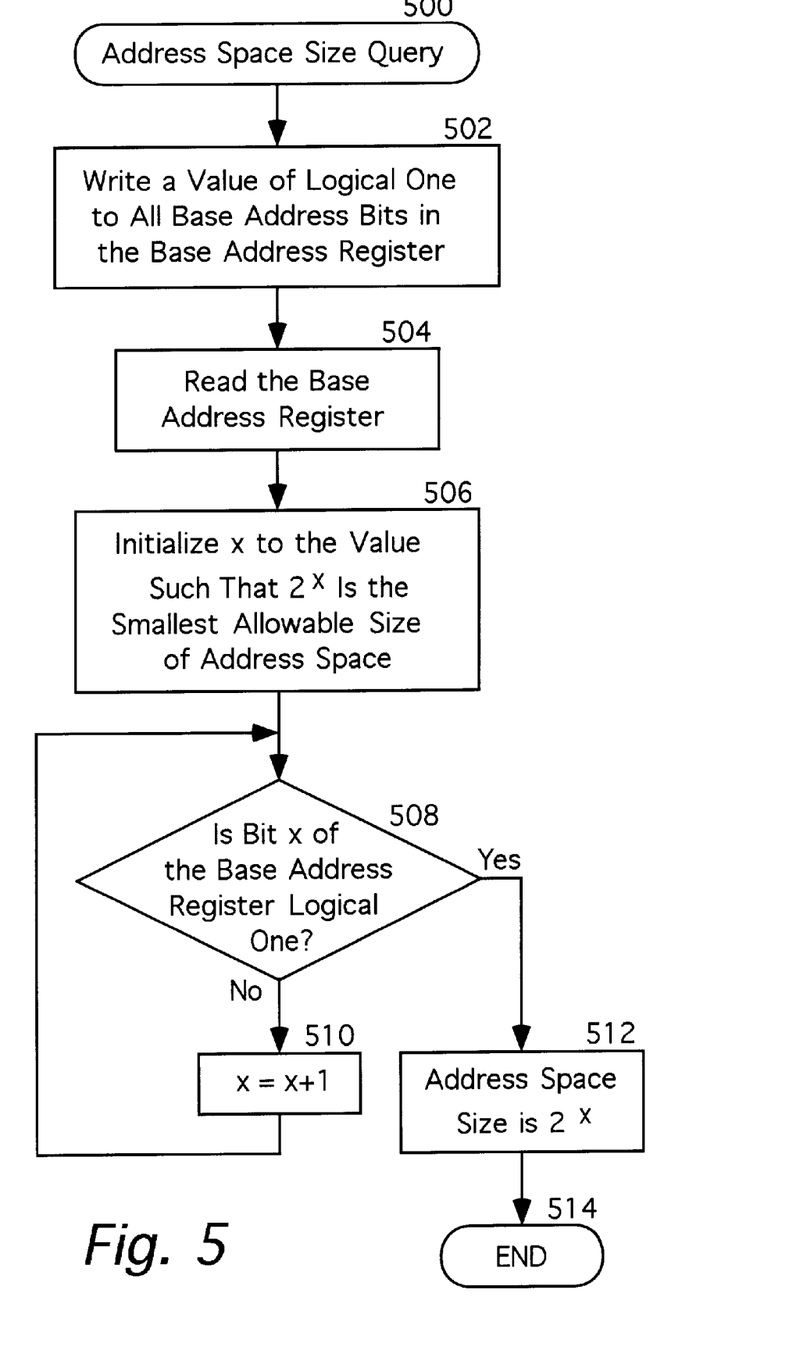
FIG. 5 shows a flow chart of the address space size query by a host processor that operates according to the PCI Specification.

FIG. 5 shows a flow chart of the address space size query 500 by a host processor that operates according to the PCI Specification. The host processor 100 initiates the query by writing a value of logical one to all the base address bits 308 in the base address register 502. Only the base address bits 308 that are enabled for writing will be written. The host processor 100 then reads the value contained in the base address register 504. The host processor then analyzes the value that was read 504 to determine the size of address space that is associated with the base address register. In the example shown in FIG. 5, the host processor analyzes the value read from the base address register 504 by initializing a value x to a value such that $2^x$ is the smallest allowable size of address space 506. If bit x of the value read from the base address register is a logical one 508, then the size of the address space associated with the base address register is 512 and the address space query is complete 514. If bit x of the value read from the base address register is not a logical one 508, then the value of x is incremented by one 510, and then the next bit of the base address register is examined 508.

Advantages

The previously described embodiments of the present invention have many advantages, including:

support of variable address space requirements;

use of standardized parts in a variety of applications with differing space requirements; and proper response to address space queries by host processors that use procedures such as the one defined by the PCI Specification.

Variable address space requirements are supported by embodiments of the present invention such as those shown in FIGS. 3A and 3C where the address space can be determined 402 and stored in the second register 114. Without this capability, the maximum conceivable address space size must be reserved. This needlessly consumes address space, which is a scarce resource in some computer systems.

The present invention allows a standardized circuit to support the interface requirements for a variety of applications that use base address registers 112. Because many different applications are able to use the same circuit, the circuits can be mass produced. This allows more highly integrated circuits, which consume less space and power, and allows these highly efficient circuits to be produced at a lower cost. The use of standardized circuitry is possible because the present invention allows the address space size supported by a base address register 112 to be adjusted without requiring changes to the circuit.

A base register mechanism implemented according to the present invention responds properly to address space queries by host processors that use procedures such as the one defined by the PCI Specification because base address bits 308 that are not needed for the size of address space being associated with the base address register 114 are disabled for writing. Thus the appropriate value will be returned during the address query illustrated in FIG. 5. In some embodiments of the present invention, base address bits 308 that are disabled for writing are set to return a known value such as logical zero 422. This allows proper support for devices that adjust the size of the address space between successive host queries.

Although a preferred embodiment of the present invention has been described and disclosed in detail, other modifications and embodiments thereof which would be apparent to one having ordinary skills are intended to be covered by the spirit and scope of the appended claims.

What is claimed is:

1. A method for configuring a base address register having m bits comprising the steps of:

receiving a value n;

setting a second register to a value of the logical one's complement of (2n−1);

enabling for writing the most significant m−n of the m bits of the base address register by enabling a bit of the base address register for writing if the value of a corresponding bit of the second register is an enabling value; and disabling for writing the least significant n bits of the m bits of the base address register by disabling for writing the bit of the base address register if the value of the corresponding bit of the second register is not the enabling value.

2. The method of claim 1 where the enabling value is a logical one.

3. The method of claim 1 where the base address register is a base address register for a peripheral device of a computer system and the value n is such that $2^n$ is the number of locations that can be addressed on the peripheral device by the computer system.

4. The method of claim 3 where the peripheral device is a PCI device and the base address register is a memory base address register.

5. The method of claim 3 where the peripheral device is a PCI device and the base address register is an expansion read-only memory (ROM) base address register.

6. The method of claim 1 further comprising the step of setting the bit of the base address register to a known logical level if the bit is disabled for writing.

7. The method of claim 6 where the base address register is a base address register for a peripheral device of a computer system and the value n is such that $2^n$ is the number of locations that can be addressed on the peripheral device by the computer system.

8. The method of claim 7 where the peripheral device is a PCI device, the base address register is a memory base address register, and the known logical level is logical zero.

9. The method of claim 7 where the peripheral device is a PCI device, the base address register is an expansion read-only memory (ROM) base address register, and the known logical level is logical zero.

10. A method for configuring a size of memory space in a PCI address space required by a Peripheral Components Interconnect (PCI) device installed in a computer system comprising the steps of:

determining the size of address space required by the PCI device;

setting a second register to a value of the logical one's complement of one less than the size of address space required;

enabling for writing a bit of a base address register if the corresponding bit of the second register is logical one, and substantially simultaneously, disabling for writing a bit of a base address register if the corresponding bit of the second register is logical zero, and substantially simultaneously, setting the bit of the base address register to logical zero if the corresponding bit of the second register is logical zero;

receiving a test value of substantially all logical ones from a central processing unit of the computer system;

writing the test value to the base address register;

receiving a request to read the base address register from a central processing unit of the computer system; and transmitting a value contained in the base address register to the central processing unit of the computer system.

11. An apparatus for storing a base address for a peripheral device of a computer system comprising:

a base address register which embodies a plurality of base address bits which store base address data; and a second register that stores an address space size;

said second register operatively connected to the base address register;

said second register enabling base address bits for writing if not required to address locations within an address space of the address space size; and said second register disabling base address bits for writing if required to address locations within the address space of the address space size.

12. The apparatus of claim 11 where the second register further comprises a second set of bits which store the address space size as the value of the logical one's complement of one less than the address space size, and the second register is operatively connected to the base address register such that the second set of bits enable and disable the corresponding base address bits.

13. The apparatus of claim 12 further comprising a central processing unit (CPU), a system bus connecting the base address register and the CPU for transmitting data between the base address register and the CPU, a controller, and a data path connecting the controller and the second register for transmitting data from the controller to the second register.

14. The apparatus of claim 13 where the system bus is a PCI bus.

15. The apparatus of claim 11 wherein a known logical level is transmitted from the disabled bits of the base address bits.

16. The apparatus of claim 15 where the second register further comprises a second set of bits which store the address space size as the value of the logical one's complement of one less than the address space size, and the second register is operatively connected to the base address register such that the second set of bits enable and disable the corresponding base address bits.

17. The apparatus of claim 16 further comprising a central processing unit (CPU), a system bus connecting the base address register and the CPU for transmitting data between the base address register and the CPU, a controller, and a data path connecting the controller and the second register for transmitting data from the controller to the second register.

18. The apparatus of claim 17 where the system bus is a PCI bus, and where the known logical level is logical zero.

* * * * *